US008272453B2

(12) United States Patent
Ullrich et al.

(10) Patent No.: US 8,272,453 B2
(45) Date of Patent: Sep. 25, 2012

(54) HANDHELD POWER TOOL

(75) Inventors: Andre Ullrich, Leinfelden-Echterdingen (DE); Richard Engel, Sebnitz (DE)

(73) Assignee: Robert Bosch GmbH, Stuttgart (DE)

( * ) Notice: Subject to any disclaimer, the term of this patent is extended or adjusted under 35 U.S.C. 154(b) by 56 days.

(21) Appl. No.: 12/866,961

(22) PCT Filed: Nov. 12, 2008

(86) PCT No.: PCT/EP2008/065376

§ 371 (c)(1), (2), (4) Date: Aug. 10, 2010

(87) PCT Pub. No.: WO2009/103362

PCT Pub. Date: Aug. 27, 2009

(65) Prior Publication Data

US 2010/0326688 A1 Dec. 30, 2010

(30) Foreign Application Priority Data

Feb. 20, 2008 (DE) ......................... 10 2008 010 100

(51) Int. Cl.

| | |
|---|---|
| ***B25D 9/00*** | (2006.01) |
| ***B25D 11/00*** | (2006.01) |
| ***B25D 16/00*** | (2006.01) |
| ***B25D 13/00*** | (2006.01) |
| ***B23B 45/16*** | (2006.01) |
| ***E21B 1/00*** | (2006.01) |

(52) U.S. Cl. ......................... 173/131; 173/133; 173/211

(58) Field of Classification Search .................. 227/132, 227/134; 173/162.1, 210–211, 128, 131–133
See application file for complete search history.

(56) References Cited

U.S. PATENT DOCUMENTS

| | | | | |
|---|---|---|---|---|
| 3,179,185 | A * | 4/1965 | O'Farrell | 173/133 |
| 4,066,136 | A | 1/1978 | Wanner | |
| 4,348,015 | A * | 9/1982 | Domer | 267/140.4 |
| 4,872,516 | A * | 10/1989 | MacFarlane et al. | 173/206 |
| 5,050,687 | A * | 9/1991 | Prokhorov et al. | 173/133 |
| 5,407,018 | A * | 4/1995 | Henry | 173/211 |
| 5,769,620 | A | 6/1998 | Briem | |
| 5,813,477 | A * | 9/1998 | Clay et al. | 173/1 |
| 5,901,894 | A * | 5/1999 | Melocco | 227/10 |
| 6,059,163 | A * | 5/2000 | Pfister et al. | 227/10 |
| 6,705,409 | B2 * | 3/2004 | Paul | 173/132 |
| 6,889,591 | B2 * | 5/2005 | Sabates et al. | 89/1.14 |
| 7,252,157 | B2 * | 8/2007 | Aoki | 173/162.2 |
| 7,861,799 | B2 * | 1/2011 | Iwakami et al. | 173/201 |
| 2006/0243467 | A1 | 11/2006 | Meixner et al. | |
| 2006/0248701 | A1 * | 11/2006 | Bernhart et al. | 29/428 |
| 2008/0245220 | A1 * | 10/2008 | Duesselberg et al. | 91/234 |
| 2008/0296034 | A1 * | 12/2008 | Braun | 173/4 |
| 2010/0126746 | A1 * | 5/2010 | Robson | 173/211 |

FOREIGN PATENT DOCUMENTS

| | | | |
|---|---|---|---|
| DE | 3511491 | A1 * | 10/1986 |
| DE | 10253973 | A1 | 6/2004 |
| EP | 1479485 | A1 | 11/2004 |
| GB | 2395455 | A | 5/2004 |
| WO | 03024671 | A2 | 3/2003 |

* cited by examiner

*Primary Examiner* — Robert Long
(74) *Attorney, Agent, or Firm* — Maginot, Moore & Beck

(57) ABSTRACT

The invention relates to a handheld machine tool, in particular a hammer drill and/or chipping hammer. The tool has an impacting unit which has at least one impacting pin and a guide unit which is provided for guiding the impacting pin. It is proposed that the guide unit is formed from at least two different materials.

9 Claims, 2 Drawing Sheets

HANDHELD POWER TOOL

CROSS-REFERENCE TO RELATED APPLICATION

Figure 1:
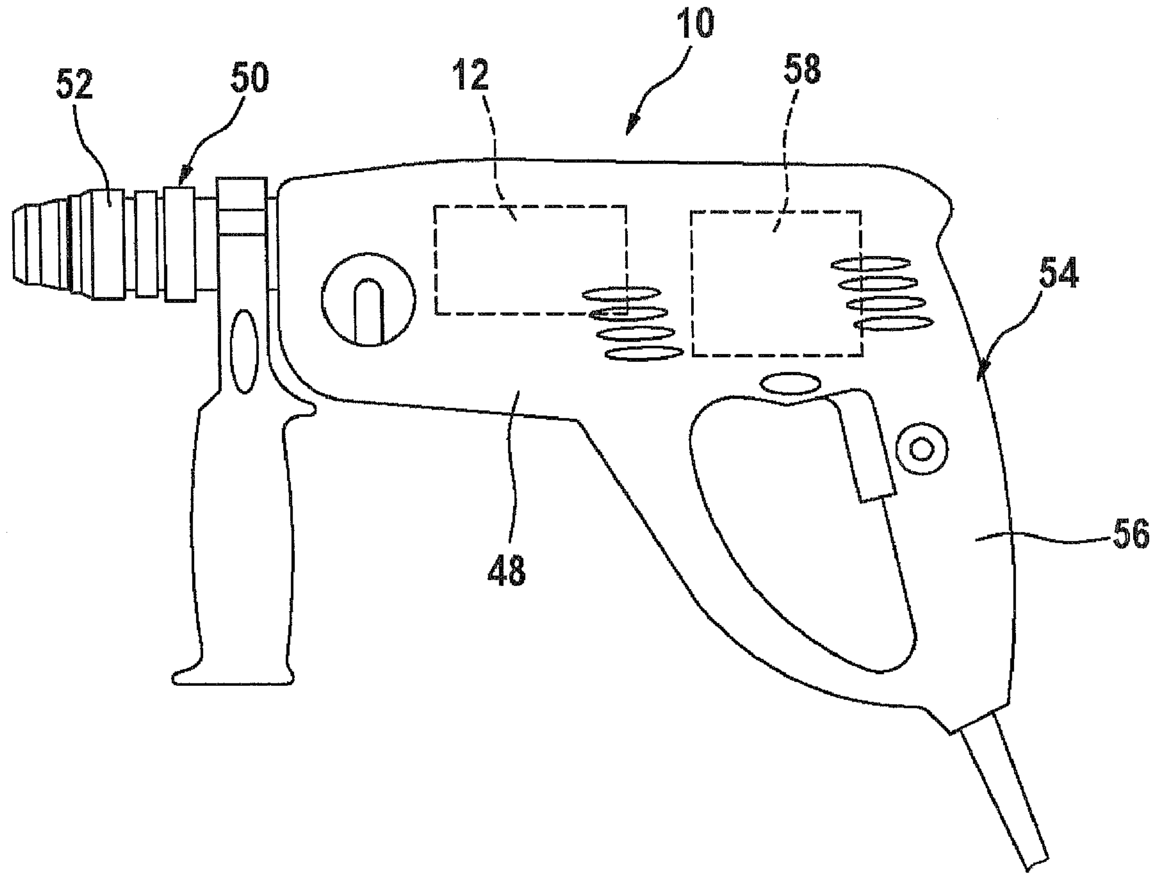

This application is a 35 USC 371 application of PCT/EP2008/065376 filed on Nov. 12, 2008.

BACKGROUND OF THE INVENTION

1. Field of the Invention

The invention is based on a handheld power tool.

2. Description of the Prior Art

A handheld power tool formed by a rotary and/or chisel hammer and having a striking unit is already known. The striking unit has a striking pin and a guide unit that is provided for guiding the striking pin.

ADVANTAGES AND SUMMARY OF THE INVENTION

The invention is based on a handheld power tool, in particular a rotary and/or chisel hammer, having a striking unit which has at least one striking pin and a guide unit that is provided for guiding the striking pin.

It is proposed that the guide unit be formed of at least two different materials. In this connection, the term “provided” should be understood in particular to mean especially equipped and/or especially designed. Moreover, “two different materials” should be understood to mean in particular two materials that differ from one another in terms of at least one material property. The striking pin is provided for transmitting an impact pulse, preferably from a striking element of the striking unit, to a tool during operation of the handheld power tool. The striking unit can be formed by a mechanical striking unit or especially advantageously by a pneumatic striking unit. Preferably, the striking unit has a hammer tube, in which the striking pin is supported. The guide unit is provided in particular for guiding the striking pin inside the hammer tube and to that end is disposed in a middle region of the striking pin that preferably has a larger cross-sectional area than a cross-sectional area in peripheral regions disposed along a length of the striking pin.

By means of the embodiment according to the invention, support and/or guidance of the striking pin inside the striking unit or hammer tube can advantageously be attained with an effective guidance property that remains as constant as possible even at high operating temperatures. Especially advantageously, a material of the guide unit that is in direct contact with the striking pin is formed by a temperature-resistant material, which over a wide temperature range has a virtually constant, only slightly varying guidance property. Furthermore, an especially lightweight, weight-saving guide unit can be realized if at least one material of the guide unit is formed by a lightweight material.

It is also proposed that the guide unit has at least one guide element, which is formed by a metal; as a result, in addition to temperature dissipation by the guide element, an advantageous stability of the guide unit can also be attained. In a further feature of the invention, an embodiment of the guide element by a further temperature-resistant or heat-resistant material, such as a Teflon material and/or other materials that appear appropriate to one skilled in the art is conceivable at any time.

It is also proposed that the guide element is formed by a sheet-metal component, as a result of which the guide unit can be made especially economically. Especially advantageously in this respect, the guide element is formed by a deep-drawn sheet-metal component, which can be made economically in a deep-drawing process. Alternatively, the guide element can also be produced by a turning process and/or other processes that appear appropriate to one skilled in the art.

Especially advantageously in this respect, the guide element is formed at least in part by a sheet-metal sleeve, so that uniform stability of the guide unit around the striking pin in a circumferential direction of the striking pin can be attained. Moreover, an advantageous introduction of force per unit of surface area can be attained by means of the sheet-metal sleeve during a B impact or recoil impetus by the striking pin on the guide unit.

It is additionally proposed that the guide element have at least in part a guide face for guiding the striking pin, as a result of which an advantageous guidance of the striking pin, which in particular reduces wear, can be attained in a structurally simple manner.

In an advantageous refinement of the invention, it is proposed that the guide unit has at least one further component, which is formed by a damping mechanism. As a result, besides guidance by the guide element, advantageous impact damping by the guide element can be attained, and it is thus possible and economical to dispense with additional components, such as a separate damping unit.

It is also proposed that the damping mechanism is formed by an elastomer, as a result of which a shape of the damping mechanism can be adapted in a structurally simple way to an installation space available inside the guide unit. Moreover, by means of the elastomer, additional components for fixation and/or support of the guide element inside the guide unit can be dispensed with, especially if the guide element is disposed at least partly on the elastomer. In this connection, the term “elastomer” should be understood to mean in particular a fixed-shape and at the same time elastically deformable material, such as a plastic comprising random and preferably wide-mesh cross-linked molecule chains that make a rubber-elastic property of the elastomer possible. Preferably, the elastomer is intended to deform in response to an exertion of force, such as a tensile and/or compressive stress, and after the exertion of force ceases, the elastomer returns to its original shape again.

Further components, installation space, assembly effort, and costs can also advantageously be saved if the guide element is embodied as at least partially in one piece with the damping mechanism. In this connection, the term “in one piece” should in particular be understood to mean formed in one part and/or from one cast and/or as one component. Preferably, the guide element can be embodied in one piece with the damping mechanism by means of a vulcanizing process and/or other processes or methods that appear appropriate to one skilled in the art.

In an advantageous refinement of the invention, it is proposed that the guide element rests at least partially on a radially inward-facing surface of the damping means. In this connection, “radially inward-facing surface” should be understood to mean in particular a face of the damping mechanism that faces inward along a radial direction that extends essentially perpendicular to a force flow direction of the striking unit and/or parallel to a diameter of the guide element. In this way, unwanted overheating of the damping mechanism can advantageously be prevented, and furthermore, during operation of the handheld power tool and particularly in an impact mode of operation, can be supported in a way that damps vibration or impact.

It is furthermore proposed that the guide unit has at least one bracing element for bracing in at least one direction on a hammer tube, as a result of which an advantageous dissipation of force via the guide unit or the bracing element to the hammer tube can be attained, and moreover, an advantageous guidance position of the guide unit or guide element inside the striking unit can be maintained.

Still further components, installation space, assembly effort and costs can advantageously be saved if the guide element and the bracing element are embodied as at least partially in one piece. Moreover, a structurally simple and in particular space-saving bracing of the guide unit or guide element on the hammer tube can be attained in this way.

It is also provided that the bracing element extends outward in a radial direction on the guide element, as a result of which a structurally simple bracing of the guide unit or guide element can be achieved.

BREIF DESCRIPTION OF THE DRAWINGS

Further advantages will become apparent from the ensuing description of the drawings. In the drawings, one exemplary embodiment of the invention is shown. The drawings, description and claims include numerous characteristics in combination. One skilled in the art will expediently consider the characteristics individually as well and put them together to make useful further combinations.

Figure 2:
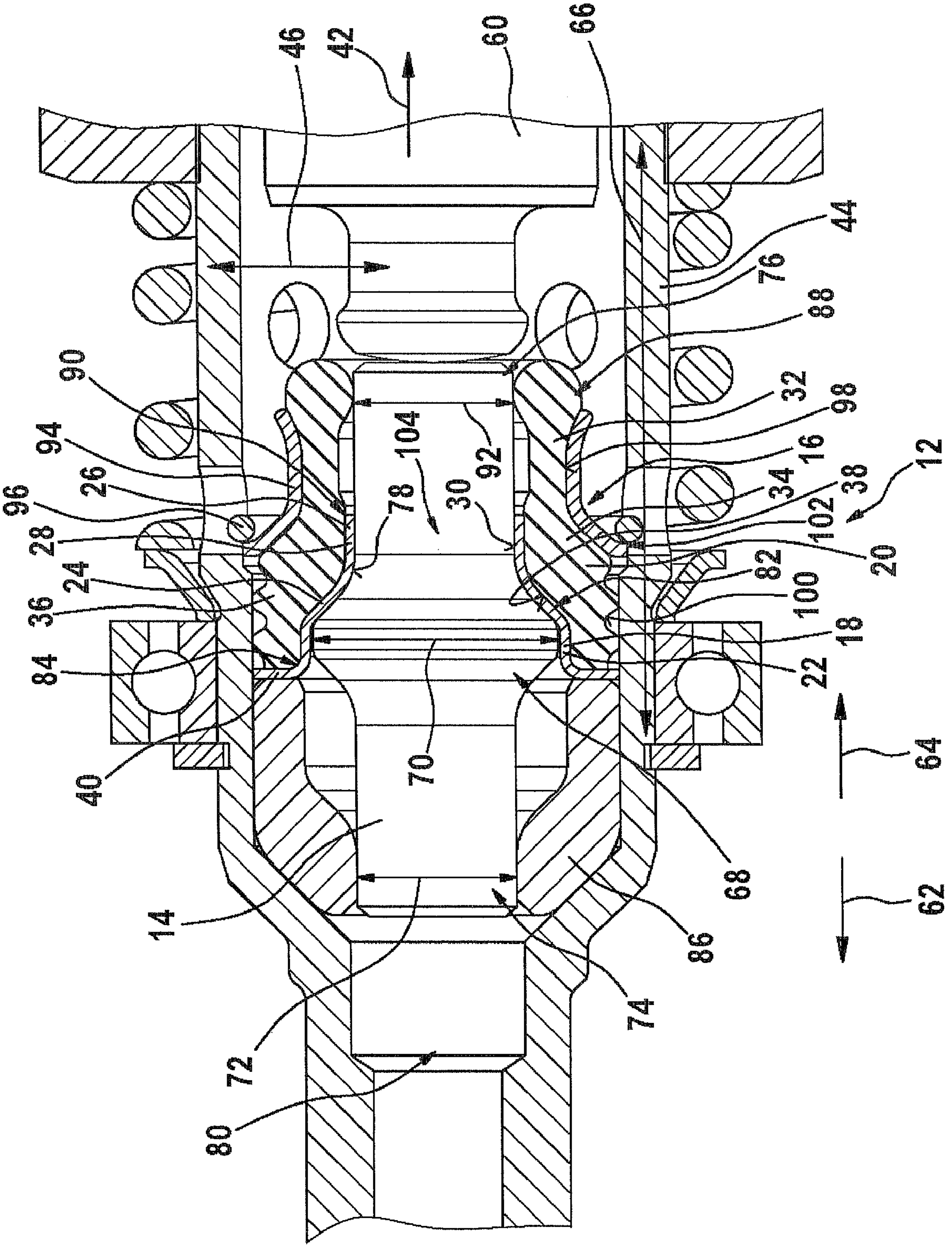

FIG. 1 shows a handheld power tool of the invention in a schematic view; and FIG. 2 shows a striking unit with a guide unit of the handheld power tool, in a schematic view.

DESCRIPTION OF THE PREFERRED EMBODIMENT

In FIG. 1, a handheld power tool 10 formed by a rotary hammer is schematically shown. The handheld power tool 10 includes a housing 48 and, in a front region 50, a tool holder 52 for receiving a tool. On a side 54 facing away from the front region 50, the handheld power tool 10 has a main handle 56 for actuation of the handheld power tool 10 and for transmitting force from a user to the handheld power tool 10. For generating a driving torque, the handheld power tool 10 has a drive unit 58, shown only schematically in FIG. 1. The driving torque of the drive unit 58 is transmitted, via a gear system, not shown in detail, of the handheld power tool 10, to a striking unit 12 and/or to a rotating power takeoff means formed by a hammer tube 44 (FIG. 2).

In FIG. 2, the striking unit 12 of the handheld power tool 10 of FIG. 1 is shown in further detail in a schematic sectional view. The striking unit 12 includes the hammer tube 44, a striking pin 14, and a guide unit 16. The guide unit 16 and the striking pin 14 are disposed inside the hammer tube 44. Furthermore, in operation of the handheld power tool 10 or in a impact mode of operation, the striking pin 14 is provided for transmitting an impact pulse from a striking element 60 of the striking unit 12 to a tool. To that end, the striking pin 14 is disposed in an axial direction 62, 64 between the striking element 60 and the tool. The axial direction 62, 64 is essentially parallel to a main extension direction 66 of the hammer tube 44. The hammer tube 44 is furthermore provided for driving the tool to rotate. In the impact mode of operation, for generating the impact pulse, the striking element 60 is driven pneumatically by a piston, not shown in further detail, to execute a reciprocating motion in the axial direction 62, 64.

The guide unit 16 is provided for guiding the striking pin 14 and to that end is disposed around the striking pin 14 in a middle region 68. In this middle region 68, the striking pin 14 has a larger diameter 70 than a diameter 72 in end regions 74, 76 of the striking pin 14 that are disposed in the axial direction 62, 64. The guide unit 16 is furthermore formed of two different materials 18, 20. For that purpose, the guide unit 16 has a guide element 22 and a further component 32, which is formed by a damping means 34; the guide element 22 is formed by the material 18 which is a metal, and the damping means 34 is formed by the material 20 which is an elastomer 36. The guide element 22 is formed by a sheet-metal sleeve 28, which is a thin-walled sheet-metal component 26. The sheet-metal sleeve 28 furthermore forms a reception region 104 for the striking pin 14. The guide element 22 and the damping means 34 are furthermore embodied in one piece with one another by means of a vulcanizing process. In an alternative embodiment of the invention, it is moreover also conceivable for the guide element 22 and the damping means 34 to form two components embodied separately from one another.

The guide element 22 rests on a surface 38 of the damping means 34 oriented inward in a radial direction 46. The guide element 22 or sheet-metal sleeve 28 also has a surface 78 oriented inward in the radial direction 46 and facing away from the damping means 34, which surface is provided by a guide face 30 for guiding the striking pin 14. The guide face 30 of the sheet-metal sleeve 28 is adapted to an outer contour of the middle region 68 of the striking pin 14. For that purpose, the sheet-metal sleeve 28, or the reception region 104 for receiving the striking pin 14, is tapered with a conically tapering portion 82 in the axial direction 64 from a reception region 80 for the tool in a direction of the striking element 60 on which region 82 the striking pin 14 in a impact mode of operation rests, when a tool is located in or has been introduced into the tool holder. An end region 90, oriented toward the striking element 60, of the sheet-metal sleeve 28 in the axial direction 64 is formed cylindrically with a constant diameter 92, and the end region 90 rests on the end region 76 of the striking pin 14.

The guide unit 16 furthermore has a bracing element 40, which is provided for bracing the guide unit 16 or guide element 22 in the axial direction 62 of the striking element 60 in a direction 42 of the reception region 80 for the tool. The bracing element 40 is embodied in one piece with the sheet-metal sleeve 28 and is disposed on an end region 84 of the sheet-metal sleeve 28 oriented toward the reception region 80 for the tool. From the sheet-metal sleeve 28, the bracing element 40 extends outward in the radial direction 46 and is braced or disposed with a radially outward-oriented region on the hammer tube 44. In the axial direction 62 from the striking element 60 in the direction 42 of the reception region 80 for the tool, the bracing element 40 is disposed between the damping means 34 and an idling ring 86. The idling ring 86 is formed of steel. In an idling mode, in which the gear unit is in a impact mode of operation but in which no pressure is exerted on the tool by a workpiece, the striking pin 14 rests (not shown in FIG. 2) on the idling ring 86 in an end position oriented toward the reception region 80 for the tool, so that wear of components of the striking unit 12 in the idling mode is advantageously reduced.

The damping means 34 is embodied in the shape of an O-ring in an end region 88 that faces away from the reception region 80 for the tool and is oriented toward the striking element 60. As a result, in an idling mode, the striking element 60 in an idling position can be retained on the damping means 34. The O-ring-like end region 88 of the damping means 34, in a impact mode of operation of the handheld power tool 10, rests on the end region 76, oriented toward the striking element 60, of the striking pin 14.

In the axial direction 64 from the reception region 80 for the tool in a direction of the striking element 60, the damping means 34 together with the guide element 22 is secured by a sleeve 94 and a snap ring 96 against motion or shifting in the axial direction 64. The sleeve 94 rests on a curved surface 98 of the damping means 34 that faces outward in the radial direction 46 and toward the striking element 60 in the axial direction 64. Furthermore, the sleeve 94 rests on the hammer tube 44 on an end region 102 facing away from the striking element 60. The snap ring 96 is disposed on the hammer tube 44 and thus fixes the sleeve 94 and the damping means 34 in the axial direction 64. The damping means 34 furthermore has an undulating contour on a radially outward-oriented surface 100 resting on the hammer tube 44, so that a damping effect of the damping means 34 in the impact mode of operation of the handheld power tool 10 is amplified.

The foregoing relates to the preferred exemplary embodiment of the invention, it being understood that other variants and embodiments thereof are possible within the spirit and scope of the invention, the latter being defined by the appended claims.

The invention claimed is:

1. A handheld power tool comprising a striking unit mounted within a striker tube that has at least one striking pin and has a guide unit surrounding said at least one striking pin for guiding said at least one striking pin, said striking unit disposed in said power tool for striking said at least one striking pin in at least one direction, said guide unit formed of at least one metal guide element and at least one elastomeric damping element, said at least one metal guide element further includes at least one bracing element having a first section extending between said elastomeric damping element and said at least one striking pin and a second section extending radially outward and along said elastomeric damping element for bracing said damping element in said at least one direction and wherein said elastomeric damping element has one end adjacent said first section in contact with said striker tube and an opposite end in contact with said at least one striking pin.

2. The handheld power tool as defined by claim 1, wherein the metal guide element is embodied as a sheet-metal component.

3. The handheld power tool as defined by claim 1, wherein the metal guide element is embodied at least partially as a sheet-metal sleeve.

4. The handheld power tool as defined by claim 1, wherein the guide unit at least partially has a guide face for guiding the striking pin.

5. The handheld power tool as defined by claim 1, wherein the metal guide element is embodied at least partially in one piece with the damping element.

6. The handheld power tool as defined by claim 1, wherein the elastomeric damping element rests at least partially on a radially inward-facing surface of the bracing element.

7. The handheld power tool as defined by claim 1, wherein the elastomeric damping element and the bracing element are embodied as at least partially in one piece.

8. The handheld power tool as defined by claim 1, wherein the power tool is a rotary and/or chisel hammer having a hammer tube.

9. The handheld power tool as defined by claim 8, wherein said second section of said bracing element braces said damping element on said hammer tube.

* * * * *